US008001120B2

(12) United States Patent
Todd et al.

(10) Patent No.: US 8,001,120 B2
(45) Date of Patent: Aug. 16, 2011

(54) RECENT CONTACTS AND ITEMS

(75) Inventors: Marc W. Todd, Redmond, WA (US); Darron Jack Stepanich, Seattle, WA (US); David W. Flynt, Lake Forest Park, WA (US); Joseph Kirk Ollis, Kirkland, WA (US); Henry Chen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 165 days.

(21) Appl. No.: 10/777,808

(22) Filed: Feb. 12, 2004

(65) Prior Publication Data

US 2005/0182798 A1    Aug. 18, 2005

(51) Int. Cl.
*G06F 17/30* (2006.01)
*G06F 17/00* (2006.01)

(52) U.S. Cl. ......... 707/736; 707/746; 707/752; 707/975

(58) Field of Classification Search ........... 707/736, 707/746, 752, 992
See application file for complete search history.

(56) References Cited

U.S. PATENT DOCUMENTS

| | | | | | |
|---|---|---|---|---|---|
| 5,943,055 | A | * | 8/1999 | Sylvan | 715/839 |
| 6,064,725 | A | * | 5/2000 | Nakanishi | 379/140 |
| 6,173,316 | B1 | * | 1/2001 | De Boor et al. | 709/218 |
| 6,243,459 | B1 | * | 6/2001 | Cannon et al. | 379/356.01 |
| 6,285,364 | B1 | * | 9/2001 | Giordano et al. | 715/804 |
| 6,320,943 | B1 | * | 11/2001 | Borland | 379/112.01 |
| 6,535,749 | B1 | * | 3/2003 | Iwata et al. | 455/556.2 |
| 6,760,431 | B1 | * | 7/2004 | Haimi-Cohen | 379/355.01 |
| 6,901,559 | B1 | * | 5/2005 | Blum et al. | 715/811 |
| 6,948,135 | B1 | * | 9/2005 | Ruthfield et al. | 715/854 |
| 6,968,213 | B1 | * | 11/2005 | Inoue | 455/564 |
| 7,493,567 | B2 | * | 2/2009 | Ollis et al. | 715/758 |
| 7,551,899 | B1 | * | 6/2009 | Nicolas et al. | 455/73 |
| 2002/0151334 | A1 | * | 10/2002 | Sharma | 455/566 |
| 2003/0065721 | A1 | * | 4/2003 | Roskind | 709/204 |
| 2003/0081753 | A1 | * | 5/2003 | Trandal et al. | 379/210.01 |
| 2003/0148790 | A1 | * | 8/2003 | Pappalardo et al. | 455/558 |

(Continued)

FOREIGN PATENT DOCUMENTS

JP         11-298635        10/1999

(Continued)

OTHER PUBLICATIONS

Sprint Online User's Guide PCS Phone Handspring Treo 300 User Guide 2002, pp. 94-96, and 72.*

(Continued)

*Primary Examiner* — Jacob F Bétit
(74) *Attorney, Agent, or Firm* — Merchant & Gould

(57) ABSTRACT

The present invention provides a method and system of displaying items that gives the user the ability to easily access recently accessed items. The recent items list includes both incoming and outgoing correspondences that are attempted to be matched to the corresponding contact stored in the device. The user can access the recent contact list and reply using any communication method available. For instance, the user could reply by phone, email, send an instant messenger message, send an SMS message, and the like. The recent items list may also include items such as communications, contacts, folder, files, messages, applications, and the like. A coalesced list of the recently used items is shown so that an item is only shown once in the recent list. Any matched item in the recent list may also be shown in the alphabetical list that appears below the recent list.

21 Claims, 8 Drawing Sheets

U.S. PATENT DOCUMENTS

| | | | |
|---|---|---|---|
| 2004/0102225 A1* | 5/2004 | Furuta et al. | 455/566 |
| 2004/0119732 A1* | 6/2004 | Grossman et al. | 345/708 |
| 2004/0119755 A1* | 6/2004 | Guibourge | 345/827 |
| 2004/0174392 A1* | 9/2004 | Bjoernsen et al. | 345/751 |
| 2004/0192270 A1* | 9/2004 | Kreitzer | 455/414.1 |
| 2005/0054381 A1* | 3/2005 | Lee et al. | 455/557 |
| 2005/0091314 A1* | 4/2005 | Blagsvedt et al. | 709/204 |

FOREIGN PATENT DOCUMENTS

| | | |
|---|---|---|
| JP | 2002-033819 | 1/2002 |
| JP | 2002-366489 | 12/2002 |

OTHER PUBLICATIONS

Solo Mio "Call Completion Services Introduction OSA Parlay Organization" Nov. 4, 2003, availible at http://www.parlay.org/en/docs/nov2003mm/Showcase_Presentations/Tuesday/06SoloMio.pdf.*

Sprint Online User's Guide PCS Phone Handspring Treo 300 User Guide 2002.*

Microsoft Middleeast—Windows XP, www.microsoft.com, printed on Oct. 13, 2008, archived on Jun. 30, 2003, and posted on Aug. 24, 2001, 2 pages.*

Notice of First Office Action mailed Jul. 6, 2010, in Chinese Pat. Appl. No. 200510008045.4, w/translation.

Notice of Rejection mailed Aug. 27, 2010, in Japanese Pat. Appl. No. 2005-036829, w/translation.

Whittaker, S., et al.; "*Contact Management: Identifying Contacts to Support Long-Term Communication*"; CSCW '02, Nov. 16-20, 2002, New Orleans, LA, USA; 10 pgs.

* cited by examiner

RECENT CONTACTS AND ITEMS

BACKGROUND OF THE INVENTION

Personal information managers such as in PDAs and cell phones typically maintain lists of contacts. These contact lists store information about each contact including items, such as: name, job title, company name, business number, home number, fax number, mobile number, email addresses, web pages, and the like. The contact lists can become very long. For example, some contact lists may include everyone in a large company. Finding contacts within these contact lists can be difficult. It can also be difficult to locate other items on the computer. For example, it may be difficult to find a folder within a large file system, or locate a field within a file. What is needed is a way to easily access contacts and items on a device that were recently used.

SUMMARY OF THE INVENTION

The present invention is directed towards a method and system of displaying items that gives the user the ability to easily access recently used items.

According to one aspect of the invention, the recent items show the items that are the most recently used. The recent items tracked may include items such as communications, contacts, folder, files, messages, applications, and the like.

According to another aspect of the invention, a recent items list includes both incoming and outgoing correspondences that are attempted to be matched to the corresponding contact stored in the device.

According to another aspect of the invention, when the recent item is a contact, the user can reply using any communication method. For instance, the user could reply by phone, email, send an instant messenger message, send an SMS message, and the like.

According to yet another aspect of the invention, the recent items list is generated such that a recent item is only shown once in the recent items list. Any matched contact in the recent list may also be shown in the alphabetical list that appears below the recent list.

According to still yet another aspect of the invention, recent access to folders, files, applications, or messages may be listed before non-recently accessed folders, files, applications or messages.

DETAILED DESCRIPTION OF THE PREFERRED EMBODIMENT

The present invention is directed towards a method and system of displaying items that gives the user the ability to easily access recently accessed items. A coalesced list of items is shown so that an item is only shown once in the recent list.

Illustrative Operating Environment

Figure 1:
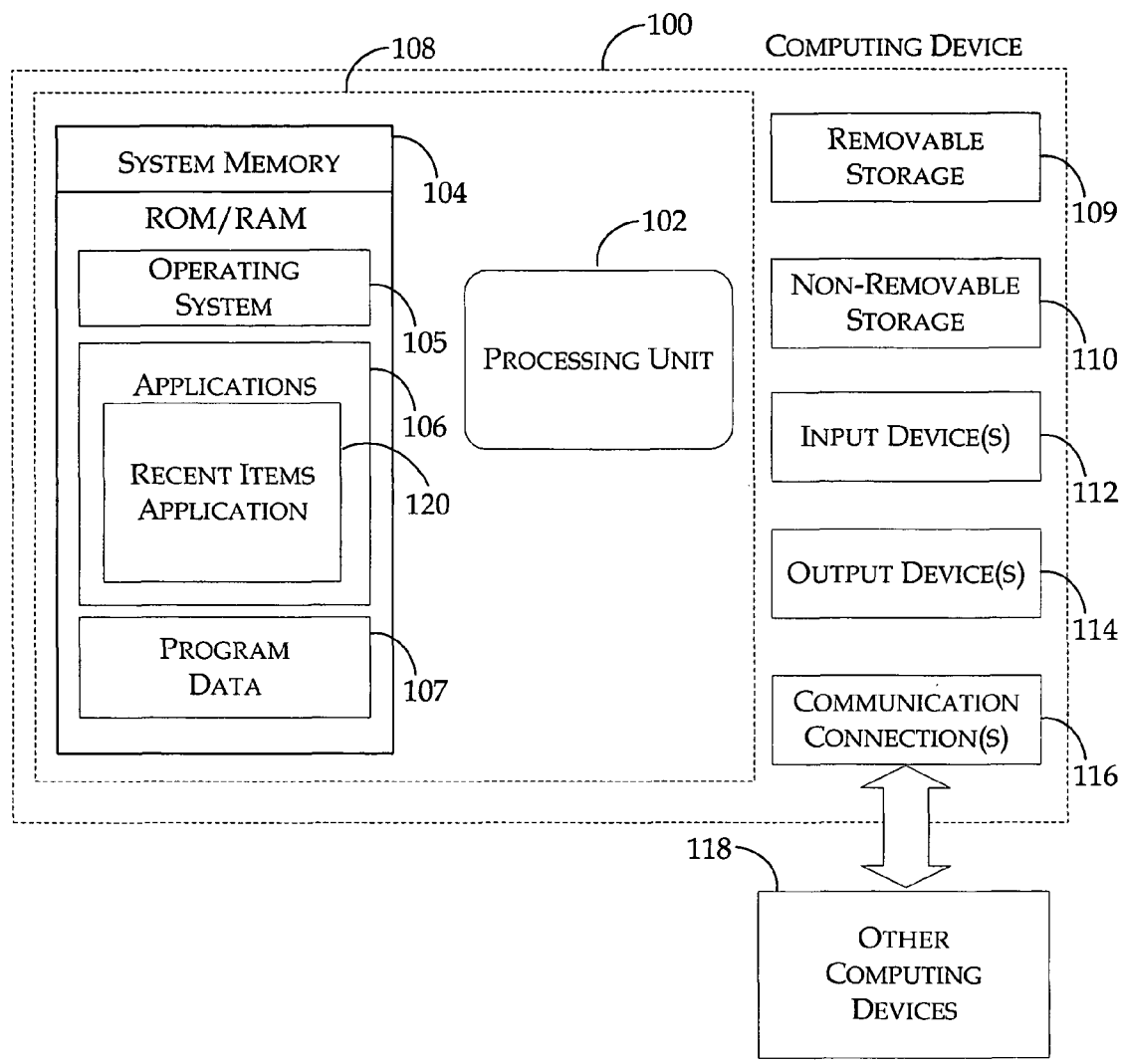
FIGS. 1 and 2 illustrate exemplary computing devices that may be used according to exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a recent items application 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
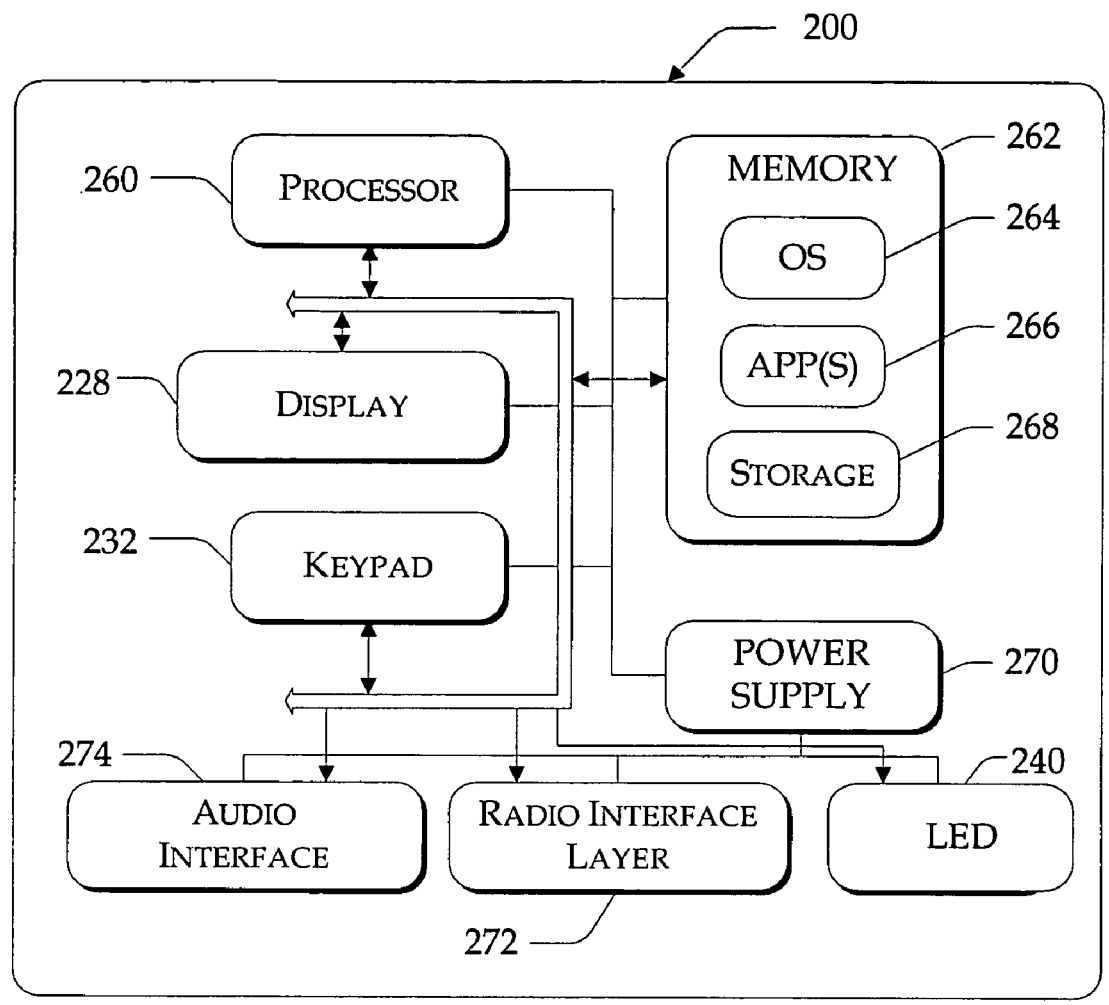

FIG. 2 illustrates a mobile computing device that may be used according to an exemplary embodiment of the present invention. Mobile computing device 200 includes processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, such as the Windows CE operating system from Microsoft Corporation, or another operating system, which is resident in memory 262 and executes on processor 260. Keypad 232 may be a push button numeric dialing pad (such as on a typical telephone), a multi-key keyboard (such as a conventional keyboard). Display 228 may be a liquid crystal display, or any other type of display commonly used in mobile computing devices. Display 228 may be touch-sensitive, and would then could also act as an input device.

One or more application programs 266 are loaded into memory 262 and run on the operating system 264. A recent items application resides on mobile computing device 200 and is programmed to provide operations relating to recently accessed items. The recent items application may reside in the hardware or software of the device. Mobile computing device 200 also includes non-volatile storage 268 within memory 262. Non-volatile storage 268 may be used to store persistent information which should not be lost if mobile computing device 200 is powered down.

Mobile computing device 200 includes power supply 270, which may be implemented as one or more batteries. Power supply 270 might further include an external power source, such as an AC adapter or a powered docking cradle that supplements or recharges the batteries.

Mobile computing device 200 is shown with two types of optional external notification mechanisms: LED 240 and audio interface 274. These devices may be directly coupled to power supply 270 so that when activated, they remain on for a duration dictated by the notification mechanism even though processor 260 and other components might shut down to conserve battery power. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes a communications connection, wireless interface layer 272, that performs the function of transmitting and receiving wireless communications. The wireless interface layer 272 facilitates wireless connectivity between the mobile computing device 200 and the outside world. According to one embodiment, transmissions to and from the wireless interface layer 272 are conducted under control of the operating system 264. In other words, communications received by wireless interface layer 272 may be disseminated to application programs 266 via operating system 264, and vice versa.

Recent Items

Figure 3:
FIG. 3 illustrates an exemplary recent items list showing recently accessed contacts.

FIG. 3 illustrates an exemplary recent items list showing recently accessed contacts, in accordance with aspects of the invention. According to one embodiment, the recent items list includes incoming and outgoing phone calls. Other recently accessed items may also be included in the same list or separate lists. For example, a recent items list may include recently accessed folders, files, applications, and the like. The recent items list may also include any recently used form of communication. For example, the recent items list could include incoming and outgoing emails, IM messages, SMS messages, and the like.

Referring to recent items list 300, the recent contacts have an icon to the left of the contact information signifying if the contact was outgoing or incoming. According to one embodiment, an outgoing call is represented by outgoing icon 305 and an incoming call is represented by incoming icon 310. Other icons could be used for other forms of communication or access to the item. When the recent item is a form of communication, an attempt is made to match incoming and outgoing numbers to the corresponding contact stored within the user's contacts (see 315 and 320). When a number is not matched to a contact name, the phone number is displayed in the recent list (see 305 and 310).

According to one embodiment of the invention, the recent items list is limited to a predetermined number of items. For example, in one embodiment, the recent items list is limited to forty, which is approximately five screens of information on a PDA. According to another embodiment, the number within the recent list may be adjusted by the user. Alternatively, the recent items could be kept for a predetermined period of time. In order to help distinguish recent items from other items, the background color of the item in the list is slightly darker than an item that is displayed in a contact list.

The recent items list (300) is generated such that a recent item, such as a recent contact, is only shown once in the recent items list. According to one embodiment, in addition to showing the contact list within the recent contact list, the contact is also shown in the user's contact list. According to one embodiment, contacts that are marked private are not shown within the recent contacts list.

The recent items list shows the most recent item first, followed by the next recent, and so on. According to one embodiment, recent contacts made within the current day show the time of the contact, and recent contacts made during a past day show the date of the contact. Referring to recent items list 300 it can be seen that the most recent contact is call 305 at a time of 4:15 pm, the next is call 310 at a time of 1:30 pm, which are followed by calls on previous days. According to one embodiment, the time a recent item is maintained in the list may be set. For example, an item may be limited to remain two days in a recent items list.

While the telephone number shown is displayed in the recent items list according to one embodiment, the user may change the contact method when appropriate shown within the recent items list by selecting the desired communication method. For example, when contact 315 is selected, the user could change the contact method shown. For example, the contact method could be changed to a home phone, or an email address if they exist. The default number of a contact in the standard contact list does change if the number in the recent items list is different.

According to another embodiment, the recent items list may be generated based on how frequently the item is accessed or communicated with rather than on the most recently used item. For example, the most frequent items are listed with the most frequently accessed item at the top of the list. Additionally, the recent items list may be generated using a combination of the frequency information and the time of the last access. For example, the user could adjust settings indicating that they want the most frequent items within a predetermined time period.

Figure 4:
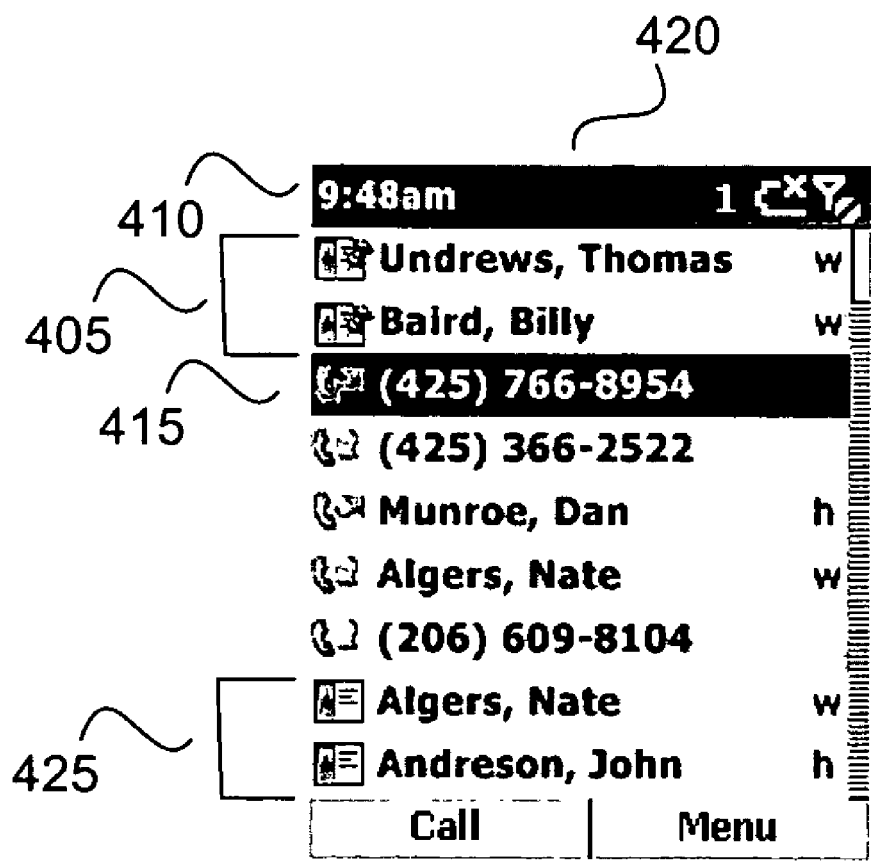
FIG. 4 illustrates using the title bar of the display to indicate a time of call for a recent item that is a communication.

FIG. 4 illustrates using the title bar of the display to indicate a time of call for a recent item that is a communication, in accordance with aspects of the present invention. As illustrated, call 415 is highlighted, and the time of the call (410) is displayed within the title bar (420). Also illustrated is that the recent calls are shown below pinned contacts 405. Generally, pinned contacts 405 are contacts that have been designated as important contacts that should be displayed before any other contacts. Below the recent calls, the standard contacts (425) are displayed.

Figure 5:
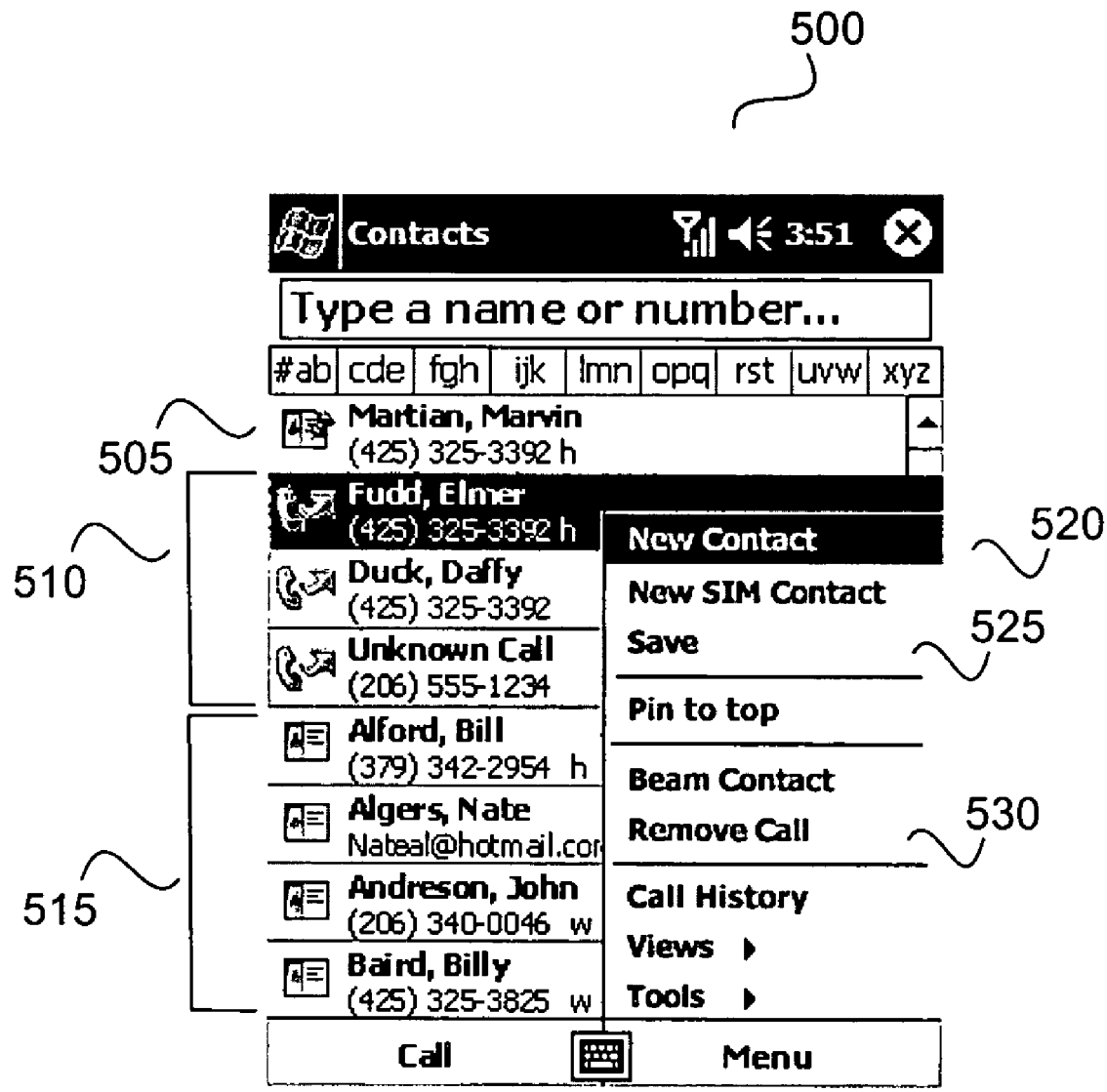
FIG. 5 illustrates an exemplary recent calls menus.

FIG. 5 illustrates an exemplary recent calls menus, in accordance with aspects of the present invention.

Contacts list 500 includes pinned contact 505 followed by recent contacts 510 and standard contacts 515. A recent call menu (520) has options that are not available to standard contacts. For example, the recent call menu (520) includes the option to remove the call (530) and the option to save the call (525). to 'Save' the unknown call and instead of saying delete the menu says 'Remove call'. The user may also create a new contact, create a pinned contact, beam the contact to another device, see the call history for this contact, as well as change views or access tools.

Figure 6:
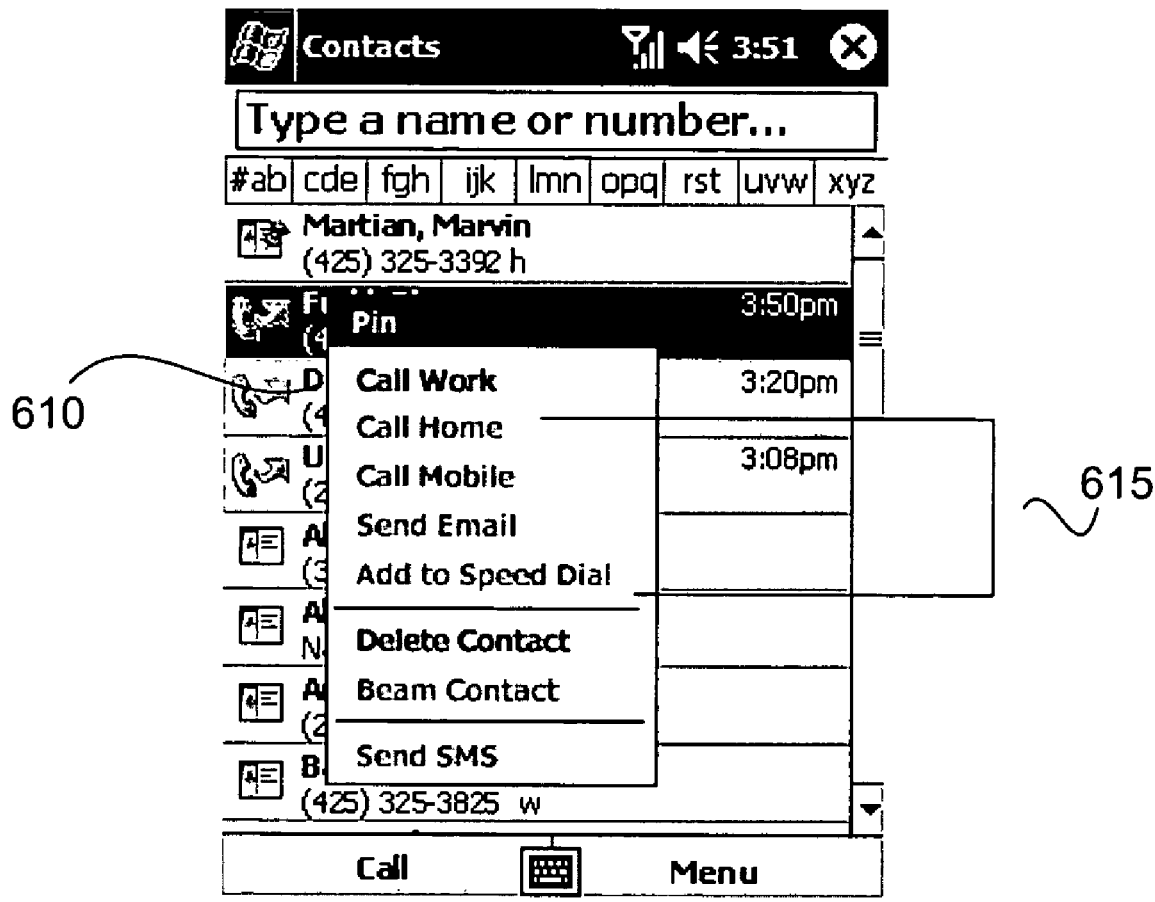
FIG. 6 illustrates an exemplary context menu of a recent call.

FIG. 6 illustrates an exemplary context menu of a recent call, in accordance with aspects of the present invention.

The context menu (610) of a recent call includes many different options, including: to pin the contact; to call work, call home, call mobile, send email, add to speed dial, delete contact, beam contact, and send an SMS message (see for example 615).

A beam contact menu option is available in menu 615. When selected, beaming a recent call will beam the associated contact. If the call is an unknown call, then the name of the beamed contact is "Unknown call" and the number that was received will be saved in the contact.

Similarly, if the recent item has no associated contact name, then the summary card developed for it inserts the number within the card and allows the user to save the call as a contact.

Figure 7:
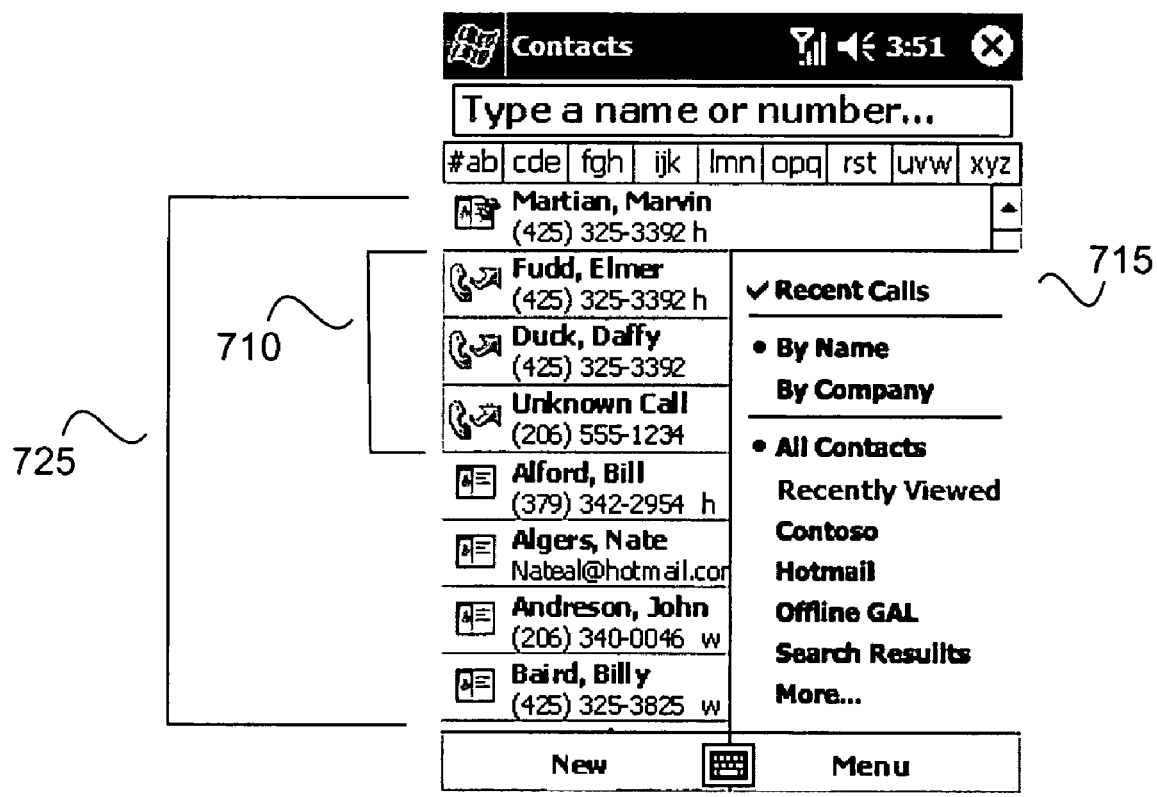
FIG. 7 illustrates an option for displaying recent calls.

FIG. 7 illustrates an option for displaying recent calls, in accordance with aspects of the present invention. A user may not desire to show their recent calls (710). When a user doesn't want to show their recent calls in the list view of contacts (725), they can turn the feature off by toggling the recent calls menu item (715). Toggling off the recent calls view does not affect the composition of the Recent List. When the recent calls option is checked, the recent calls (710) are displayed in the list view.

Figure 8:
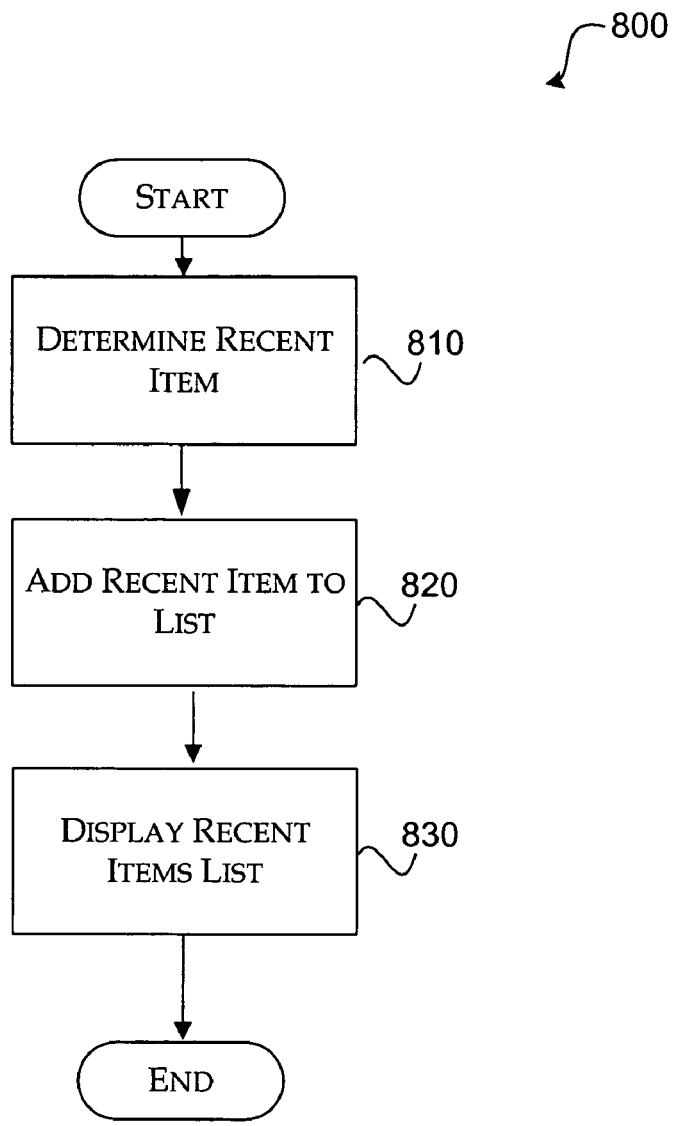
FIG. 8 illustrates a process for utilizing a recent items list, in accordance with aspects of the invention.

FIG. 8 illustrates creating a recent items list, in accordance with aspects of the invention. After a start block, the process flows to block 810 to determine a recent item. While the above examples illustrate recent items that are communications, the recent items may be any item on the device that may be accessed by the user. For example, a user access a file or folder within the file system. The user may also access a field within a file. For example, a user could access the mobile telephone number field within a contact. The user could also access an application.

Flowing to block 820, the item recently accessed is added to the recent item list. In this way, the recently accessed item may be easily accessed.

Next at block 830, the recent items are displayed. The recent items are displayed such that they are visually distinguishable from the non-recently accessed items. For example, a recent item is displayed at the top of the folder list and includes a visual indication that it has been recently accessed. The process then moves to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method executing on a processor of a computing device for displaying recent items, comprising:
   determining a recent item using the processor from recently accessed items; wherein the recently accessed items include recent incoming phone calls; recent outgoing phone calls; recently received electronic messages; recent outgoing electronic messages; recent access of contacts; recent incoming SMS messages; recent outgoing SMS messages; recent incoming IM messages; recent outgoing IM messages; recently accessed files and recently accessed applications;
   replacing the recent item with a contact maintained in a contact list when recent item has an associated contact within a contact list;
   placing the recent item in the recent items list that includes all recently accessed items;
   generating the recent items list such that recent items associated with a contact are coalesced and shown as only one item; and recent items related to a pinned contact are listed higher than items from a standard contact; and
   displaying the recent items list on a display;
   displaying non-recently accessed contacts after the displayed list of recent items; and
   in response to selection of a recent item, displaying a context menu, wherein an option in the context menu depends on whether a selected recent item is replaced by a contact.

2. The method of claim 1, wherein determining the recent item further comprises determining a time associated with the communication.

3. The method of claim 2, wherein determining the recent item further comprises determining a frequency associated with the recent item.

4. The method of claim 1, further comprising using the communication connection to reply to the recent contact by using any available communication method.

5. The method of claim 1, wherein the recent items list is limited to a predetermined number of recent items.

6. The method of claim 2, wherein determining the recent item based on the communication further comprises determining when the communication is private and when the communication is private marking the communication as a non-recent item such that the recent item is not placed in the recent items list.

7. The method of claim 2, further comprising instructing the display to display the time of the communication within a title bar of a contacts window when the recent contact is highlighted.

8. A computer-readable storage medium for displaying recent items having computer executable instructions which when executed on a processor cause the processor to perform a method, the method comprising:
   determining a recent item using the processor from recently accessed items;
   wherein the recently accessed items include: recent incoming phone calls; recent outgoing phone calls; recently received electronic messages; recent outgoing electronic messages; recent access of contacts; recent incoming SMS messages; recent outgoing SMS messages; recent incoming IM messages; recent outgoing IM messages; recently accessed files and recently accessed applications;
   replacing the recent item with a contact maintained in a contact list when recent item has an associated contact within a contact list;
   placing the recent item in the recent items list that includes all recently accessed items;
   generating the recent items list such that recent items associated with a contact are coalesced and shown as only one item; and recent items related to a pinned contact are listed higher than items from a standard contact; and
   displaying the recent items list on a display;
   displaying non-recently accessed contacts after the displayed list of recent items; and in response to selection of a recent item, displaying a context menu, wherein an option in the context menu depends on whether a selected recent item is replaced by a contact.

9. The computer-readable storage medium of claim 8, wherein determining the recent item further comprises determining a time associated with the communication.

10. The computer-readable storage medium of claim 9, wherein determining the recent item further comprises determining a frequency associated with the recent item.

11. The computer-readable storage medium of claim 8, further comprising using the communication connection to reply to the recent contact by using any available communication method.

12. The computer-readable storage medium of claim 8, wherein the recent items list is limited to a predetermined number of recent items.

13. The computer-readable storage medium of claim 9, wherein determining the recent item based on the communication further comprises determining when the communication is private and when the communication is private marking the communication as a non-recent item such that the recent item is not placed in the recent items list.

14. The computer-readable storage medium of claim 9, further comprising instructing the display to display the time of the communication within a title bar of a contacts window when the recent contact is highlighted.

15. A system for displaying recent items, comprising:
a communications connection configured to receive a communication;
a display configured to display a recent items list; and
a recent items application configured to perform actions, including:
determining a recent item from recently accessed items; wherein the recently accessed items include: recent incoming phone calls; recent outgoing phone calls; recently received electronic messages; recent outgoing electronic messages; recent access of contacts; recent incoming SMS messages; recent outgoing SMS messages; recent incoming IM messages; recent outgoing IM messages; recently accessed files and recently accessed applications;
replacing the recent item with a contact maintained in a contact list when recent item has an associated contact within a contact list;
placing the recent item in the recent items list that includes all recently accessed items;
generating the recent items list such that recent items associated with a contact are coalesced and shown as only one item; and recent items related to a pinned contact are listed higher than items from a standard contact; and
displaying the recent items list on the display;
displaying non-recently accessed contacts after the displayed list of recent items; and
in response to selection of a recent item, displaying a context menu, wherein an option in the context menu depends on whether a selected recent item is replaced by a contact.

16. The system of claim 15, wherein determining the recent item further comprises determining a time associated with the communication.

17. The system of claim 16, wherein determining the recent item further comprises determining a frequency associated with the recent item.

18. The system of claim 15, further comprising using the communication connection to reply to the recent contact by using any available communication method.

19. The system of claim 15, wherein the recent items list is limited to a predetermined number of recent items.

20. The system of claim 16, wherein determining the recent item based on the communication further comprises determining when the communication is private and when the communication is private marking the communication as a non-recent item such that the recent item is not placed in the recent items list.

21. The system of claim 16, further comprising instructing the display to display the time of the communication within a title bar of a contacts window when the recent contact is highlighted.

* * * * *

UNITED STATES PATENT AND TRADEMARK OFFICE
CERTIFICATE OF CORRECTION

| | | |
|---|---|---|
| PATENT NO. | : 8,001,120 B2 | Page 1 of 1 |
| APPLICATION NO. | : 10/777808 | |
| DATED | : August 16, 2011 | |
| INVENTOR(S) | : Marc W. Todd et al. | |

It is certified that error appears in the above-identified patent and that said Letters Patent is hereby corrected as shown below:

In column 5, line 63, in Claim 1, delete "include" and insert -- include: --, therefor.

Signed and Sealed this
Fourth Day of October, 2011

David J. Kappos
*Director of the United States Patent and Trademark Office*